US010795019B2

(12) United States Patent
Imai

(10) Patent No.: US 10,795,019 B2
(45) Date of Patent: Oct. 6, 2020

(54) OBJECT DETECTOR, SENSING DEVICE, AND MOBILE APPARATUS

(71) Applicant: RICOH COMPANY, LTD., Tokyo (JP)

(72) Inventor: Shigeaki Imai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 193 days.

(21) Appl. No.: 15/632,553

(22) Filed: Jun. 26, 2017

(65) Prior Publication Data
US 2018/0003821 A1 Jan. 4, 2018

(30) Foreign Application Priority Data
Jul. 1, 2016 (JP) .................................. 2016-131182

(51) Int. Cl.
| | | |
|---|---|---|
| G01S 17/02 | (2020.01) | |
| G01S 17/04 | (2020.01) | |
| G01S 7/481 | (2006.01) | |
| G01S 7/484 | (2006.01) | |
| G01S 17/42 | (2006.01) | |

(Continued)

(52) U.S. Cl.
CPC .............. G01S 17/04 (2020.01); G01S 7/484 (2013.01); G01S 7/4815 (2013.01); G01S 7/4817 (2013.01); G01S 17/42 (2013.01); G01S 17/931 (2020.01); G01V 8/20 (2013.01); G01V 8/22 (2013.01)

(58) Field of Classification Search
CPC .... G01S 17/026; G01S 7/4815; G01S 7/4817; G01S 7/484; G01S 17/42; G01S 17/936; G01V 8/20; G01V 8/22
See application file for complete search history.

(56) References Cited

U.S. PATENT DOCUMENTS

| | | |
|---|---|---|
| 5,831,717 A | 11/1998 | Ikebuchi |
| 6,061,001 A | 5/2000 | Sugimoto |

(Continued)

FOREIGN PATENT DOCUMENTS

| | | |
|---|---|---|
| JP | 07-167958 A | 7/1995 |
| JP | 2009-063339 | 3/2009 |

(Continued)

OTHER PUBLICATIONS

Extended European Search Report dated Dec. 12, 2017 in Patent Application No. 17175807.1, 9 pages.

(Continued)

*Primary Examiner* — Georgia Y Epps
*Assistant Examiner* — Don J Williams
(74) *Attorney, Agent, or Firm* — Xsensus LLP

(57) ABSTRACT

An object detector includes a light-emitting system and a light-receiving system. The light-emitting system includes a light source including a plurality of light-emitting elements disposed in one-axis direction. The light-emitting system emits light. The light-receiving system receives the light emitted from the light-emitting system and reflected by an object. The plurality of light-emitting elements emits a plurality of light beams to a plurality of areas differing in the one-axis direction. The amount of light to illuminate some of the plurality of areas is different from the amount of light to illuminate other area other than the some of the plurality of areas.

16 Claims, 15 Drawing Sheets

(51) Int. Cl.
*G01S 17/931* (2020.01)
*G01V 8/20* (2006.01)
*G01V 8/22* (2006.01)

(56) References Cited

U.S. PATENT DOCUMENTS

| | | | |
|---|---|---|---|
| 6,856,919 B1 | 2/2005 | Bastian et al. | |
| 7,369,268 B2 * | 5/2008 | Oehlbeck | F21K 9/00 |
| | | | 347/232 |
| 2005/0046823 A1 | 3/2005 | Ando et al. | |
| 2007/0181810 A1 | 8/2007 | Tan et al. | |
| 2008/0174771 A1 * | 7/2008 | Yan | G01N 21/8901 |
| | | | 356/237.5 |
| 2013/0229645 A1 | 9/2013 | Suzuki et al. | |
| 2014/0009747 A1 | 1/2014 | Suzuki et al. | |
| 2014/0034817 A1 | 2/2014 | Nakamura et al. | |
| 2014/0036071 A1 * | 2/2014 | Nakamura | G01J 1/0422 |
| | | | 348/135 |
| 2014/0209793 A1 | 7/2014 | Nakamura et al. | |
| 2015/0160341 A1 | 6/2015 | Akatsu et al. | |
| 2015/0316650 A1 | 11/2015 | Imai | |
| 2015/0331108 A1 | 11/2015 | Itami et al. | |
| 2016/0061955 A1 | 3/2016 | Imai et al. | |
| 2016/0261090 A1 | 9/2016 | Sakai et al. | |
| 2016/0274223 A1 | 9/2016 | Imai | |
| 2016/0349371 A1 | 12/2016 | Suzuki et al. | |

FOREIGN PATENT DOCUMENTS

| | | |
|---|---|---|
| JP | 2009-069003 | 4/2009 |
| JP | 2010-151958 A | 7/2010 |
| JP | 2011-128112 | 6/2011 |
| JP | 2012-107984 | 6/2012 |
| JP | 2013-170962 A | 9/2013 |
| JP | 2014-020889 | 2/2014 |
| JP | 2014-029317 | 2/2014 |
| JP | 2014-032149 | 2/2014 |
| JP | 2014-145744 | 8/2014 |
| JP | 2015-129734 A | 7/2015 |
| JP | 2015-212647 | 11/2015 |
| JP | 2015-215282 | 12/2015 |
| JP | 2016-046211 | 4/2016 |
| JP | 2016-057141 | 4/2016 |
| JP | 2016-127214 | 7/2016 |
| JP | 2016-161533 | 9/2016 |
| JP | 2016-176721 | 10/2016 |
| JP | 2017-032552 | 2/2017 |
| JP | 2017-090144 | 5/2017 |
| WO | WO 2015/129907 A1 | 9/2015 |

OTHER PUBLICATIONS

Office Action dated Jun. 16, 2020, issued in corresponding Japanese Patent Application No. 2016-131182, 3 pages.

* cited by examiner

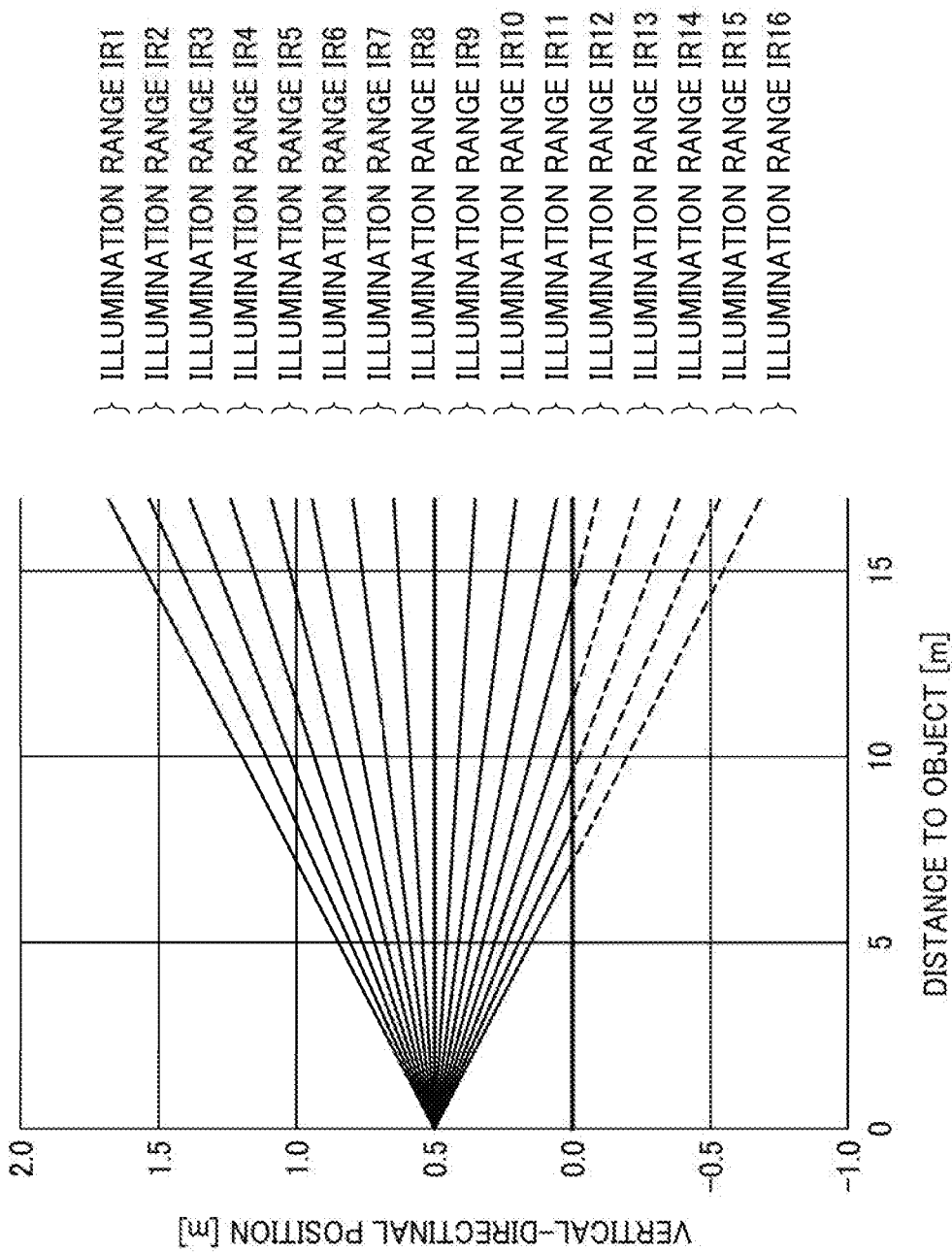

FIG. 16A    FIG. 16B    FIG. 16C
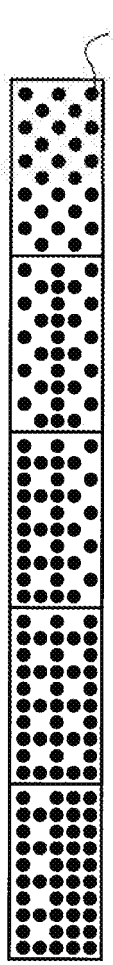
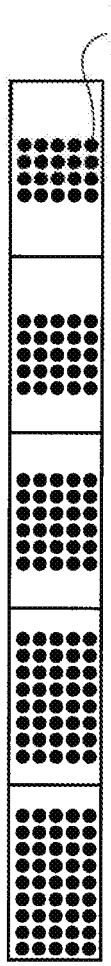
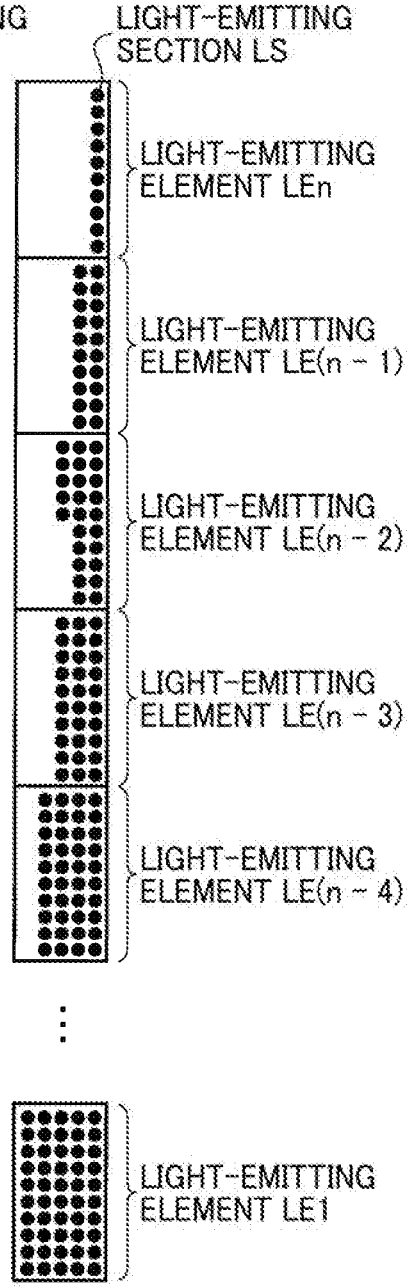
LIGHT-EMITTING SECTION LS (16A)
LIGHT-EMITTING SECTION LS (16B)
LIGHT-EMITTING SECTION LS (16C)
LIGHT-EMITTING ELEMENT LEn
LIGHT-EMITTING ELEMENT LE(n − 1)
LIGHT-EMITTING ELEMENT LE(n − 2)
LIGHT-EMITTING ELEMENT LE(n − 3)
LIGHT-EMITTING ELEMENT LE(n − 4)
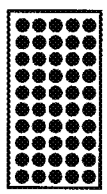
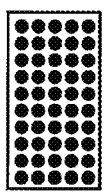
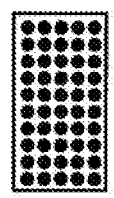
LIGHT-EMITTING ELEMENT LE1
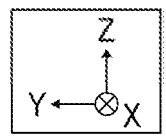

OBJECT DETECTOR, SENSING DEVICE, AND MOBILE APPARATUS

CROSS-REFERENCE TO RELATED APPLICATIONS

This patent application is based on and claims priority pursuant to 35 U.S.C. § 119(a) to Japanese Patent Application No. 2016-131182, filed on Jul. 1, 2016 in the Japan Patent Office, the entire disclosures of which is hereby incorporated by reference herein.

BACKGROUND

Technical Field

Embodiment of the present disclosure relate to an object detector, a sensing device, and a mobile apparatus.

Related Art

There have been known devices that include a light-emitting system and a light-receiving system to detect information regarding the object such as the presence of an object and the distance to the object.

However, such devices has room for improvement in achieving both an increase in detection distance and prevention of erroneous detection.

SUMMARY

In one aspect of this disclosure, there is provided an improved object detector including a light-emitting system and a light-receiving system. The light-emitting system includes a light source including a plurality of light-emitting elements disposed in one-axis direction. The light-emitting system emits light. The light-receiving system receives the light, emitted from the light-emitting system and reflected by an object. The plurality of light-emitting elements emits a plurality of light beams to a plurality of areas differing in the one-axis direction. The amount of light to illuminate some of the plurality of areas is different from the amount of light to illuminate other area other than the some of the plurality of areas.

In another aspect of this disclosure, there is provided an improved sensing device including the object detector as described above and a monitoring controller. The monitoring controller obtains object data including at least one of a presence or an absence of the object, a direction of movement of the object, and a speed of movement of the object based on an output of the object detector.

In still another aspect of this disclosure, there is provided an improved mobile apparatus including the object detector as described above and a mobile object provided with the object detector.

In yet another aspect of this disclosure, there is provided an improved mobile apparatus including the sensing device as described above and a mobile object provided with the sensing device.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 9 is an illustration of a relation between an illumination range and a detection distance;

FIGS. 16A through 16C each is an illustration of a configuration according to Example 6 of the present disclosure;

Figure 1:
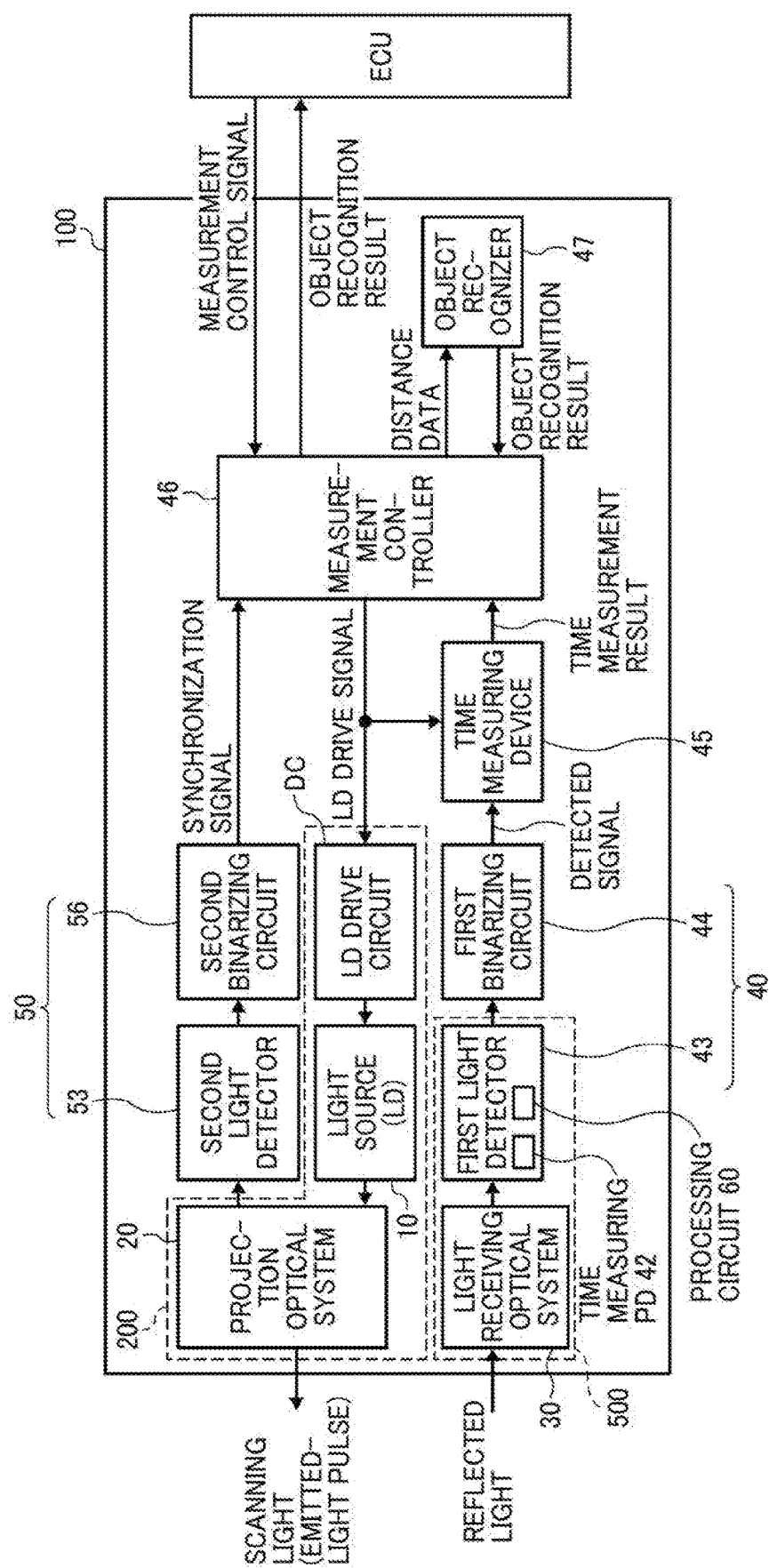
FIG. 1 is a block diagram of a schematic configuration of an object, detector according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

There is a LiDAR (light Detection and Ranging) device as an in-vehicle device to detect the presence of an object ahead of a running vehicle and the distance to the object. There are various optical systems for LiDARs. Some optical systems, for example, emit a laser beam emitted from a light source and scan a scanning range with the laser beam using a rotating mirror. Then, a light detector detects the light reflected or scattered from an object using the rotating mirror again, thus detecting the presence of the object within a desired range and the distance to the object. Such an optical system that scans an area illuminated by a laser beam and an area to be detected by a light detector concentrates a laser beam on only a portion to be detected, which is advantageous from the viewpoints of accuracy of detection, the detection distance, and the cost for the detector because the detectable range of the detector is minimized in the optical system.

In such a scanning LiDAR, the laser emitting light at short intervals in the scanning direction allows for high resolution of images. To increase resolution of images in a vertical scanning direction (a direction perpendicular to the scanning direction), the number of lasers or photodetectors in the vertical scanning direction is increased, thereby increasing the number of layers in the vertical direction.

However, increasing the number of photo detectors in the vertical scanning direction to increase the number of layers typically reduces the amount of light for each layer, resulting in a decrease in detection distance. For this reason, the number of lasers in the vertical scanning direction is preferably increased to increase resolution of images in the vertical scanning direction. Further, the lasers are preferably disposed in array to downsize the device.

With an increase in layers, a wide range in the vertical direction can be detected, so that a range, e.g., from the ground surface to an object in front, can be detected at substantially the same time. In this case, a long-range detection is performed for the object in front while such a long-range detection is not performed for the detection of the ground surface.

The detection distance of the LiDAR is mostly determined by the amount of light emitted from the LiDAR. Accordingly, for example, any layer to detect the ground surface having an excessively increased amount of light is not appropriate for safety and might create ghost light or stray light, thereby causing any erroneous detection. Hence, any layer to detect the group surface does not preferably have a large amount of light. As described above, with an increase in detectable layers, the amount of light for detection changes for each layer.

The present inventor has conceived of the following embodiments that change the amount of light between layers to achieve an object detector that allows for an increase in detection distance and prevention of any erroneous detection.

A description is provided of an object detector 100 according to one embodiment of the present disclosure referring to the drawings.

FIG. 1 is a block diagram of a schematic configuration of the object detector 100.

The object detector 100 is a LiDAR (Light Detection and Ranging) device to detect information (information regarding an object) regarding the presence of an object, such as a preceding vehicle, a parked vehicle, a structure, or a pedestrian, and the distance to the object. The object detector 100, which is mounted on a vehicle, e.g., an automobile, as a mobile object, is powered from a vehicle batter. In the present embodiment, a scanning LiDAR is used as the object detector 100. In some embodiments, a non-scanning LiDAR may be used instead.

As illustrated in FIG. 1, the object detector 100 includes a light-emitting system 200, a light receiving optical system 30, a detection system 40, a time measuring device 45, a synchronous system 50, a measurement controller 46, and an object recognizer 47.

The light-emitting system 200 includes a light source 10 (a laser diode LD), a laser diode (LD) drive circuit 12, and a projection optical system 20.

The laser diode LD used as the light source 10 is also called an edge-surface emitting laser. The light source 10 is driven by the LD drive circuit DC to emit a laser beam. The LD drive circuit DC having received a LD drive signal (a rectangular pulse signal) from the measurement controller 46 generates a drive current and applies the drive current to the light source 10. Then, the light source 10 emits light. The measurement controller 46 starts or stops the measurement in response to a measurement control signal (a measurement start signal and a measurement stop signal) from an electronic control unit (ECU) on vehicle.

Figure 2A:
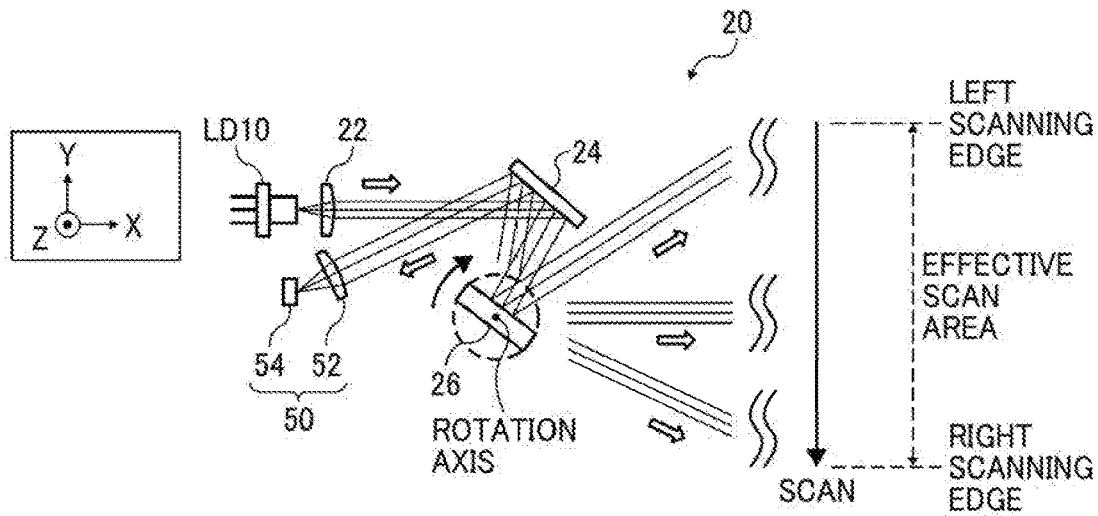
FIG. 2A is an illustration of a projection optical system and a synchronous system.
Figure 2B:
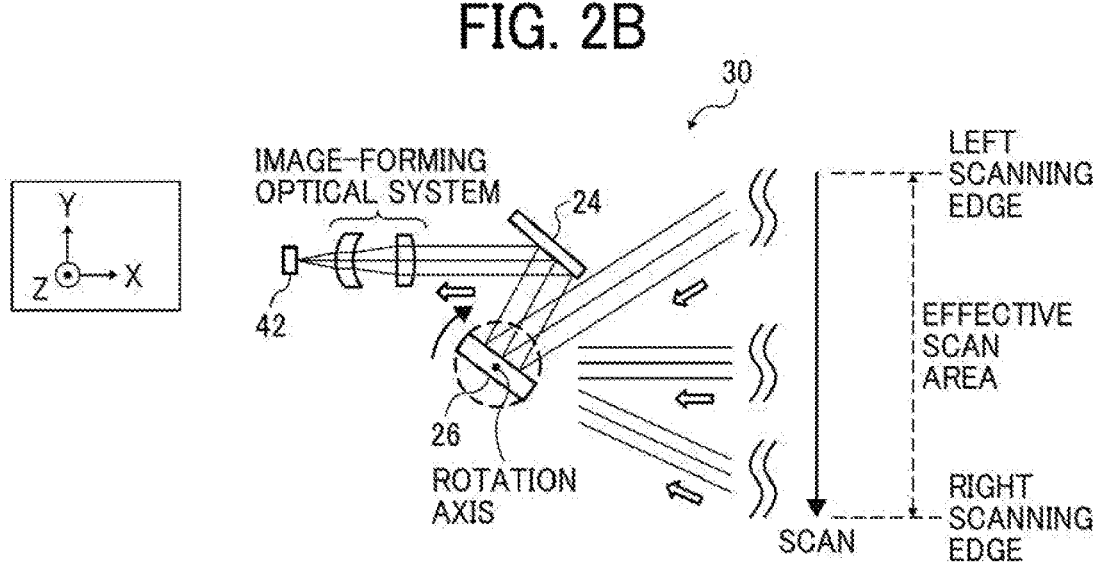
FIG. 2B is an illustration of a light receiving optical system.

FIG. 2A schematically illustrates the projection optical system 20 and the synchronous system 50. FIG. 2B schematically illustrates the light receiving optical system 30. A description is provided below of the projection optical system 20, the synchronous system 50, and the light receiving optical system 30, using an XYZ three-dimensional rectangular coordinate system illustrated in FIGS. 2A, 2B, and 2C as appropriate, in which a vertical direction is a Z-axis direction.

The projection optical system 20 includes a coupling lens 22, a reflection mirror 24, and a rotating mirror 26 as a light deflector. The coupling lens 22 is disposed on the optical path of light emitted from the c. The reflection mirror 24 is disposed on the optical path of the light having passed through the coupling lens 22. The rotating mirror 26 is disposed on the optical path of the light reflected from the reflection mirror 24. In this case, the reflection mirror 24 is disposed on the optical path between the coupling lens 22 and the rotating mirror 26, such that the optical path is folded to reduce the size of the object detector 100.

In the optical path, the light emitted from the light source 10 passes through the coupling lens 22 to be shaped into a predetermined beam profile, and the shaped light is then reflected by the reflection mirror 24. The rotating mirror 26 deflects the reflected light around the axis Z within a predetermined range of deflection.

The light deflected by the rotating mirror 26 within the predetermined range of deflection corresponds to light projected by the projection optical system 20, that is, light projected from the object detector 100.

The rotating mirror 26 includes a plurality of reflection planes around the axis of rotation, which is parallel to the axis Z, to reflect (deflect) the light reflected from the reflection mirror 24 while rotating around the axis of rotation, thereby causing the light to unidimensionally scan an effective scan area corresponding to the range of deflection in a horizontal one-axis direction (Y-axis direction). In this case, the range of deflection, i.e., the effective scan area lies on +X side. Hereinafter, the direction of rotation of the rotating mirror 26 is referred to as a "direction of rotation of mirror". In the present disclosure, the effective scan area is referred to also as a projection range or a detection range.

As illustrated in FIG. 2A, the rotating mirror 26 includes two reflection planes opposed to each other. However, the present disclosure is not limited to the configuration. In some embodiments, the rotating mirror 26 may include one reflection plane or three or more reflection planes. Alternatively, in some embodiments, the rotating mirror 26 includes at least two reflection planes, which are tilted at different angles with respect to the axis of rotation (axis Z), to switch an area to be scanned and detected in Z-axis direction.

The light receiving optical system 30 includes, as illustrated in FIG. 2B, the rotating mirror 26, the reflection mirror 24, and an image-forming optical system. The rotating mirror 26 reflects light projected from the projection optical system 20 and reflected (scattered) by an object within an effective scan area. The reflection mirror 24 reflects the light reflected from the rotating mirror 26. The image-forming optical system forms an image of the light reflected from the reflection mirror 24 onto a time measuring PD 42.

Figure 2C:
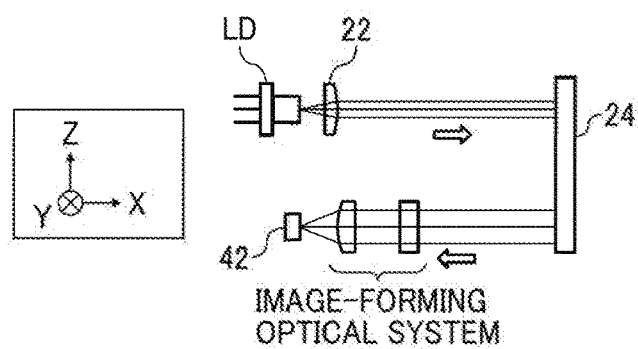
FIG. 2C is a schematic view of an optical path from a light-emitting device to a reflection mirror and another optical path from the reflection mirror to a time-measuring photo diode (PD)

FIG. 2C is an illustration of an optical path between the light source 10 (laser diode LD) and the reflection mirror 24 and another optical path between the reflection mirror 24 and the time measuring PD 42.

As is clear from FIG. 2C, the projection optical system 20 and the light receiving optical system 30 overlap in Z-axis direction. The rotating mirror 26 and the reflection mirror 24 are common between the projection optical system 20 and the light receiving optical system 30. Such a configuration can reduce relative misalignment between the illumination range IR of the light source 10 (the laser diode LD) and the light-receivable range LR of the time measuring PD 42 on an object, thus achieving stable detection of the object.

The light projected from the projection optical system 20 and reflected (scattered) by an object proceeds, via the rotating mirror 26 and the reflection mirror 24, through the image-forming optical system, thereby collecting on the time measuring PD 42, referring to FIG. 2B. in FIG. 2B, the reflection mirror 24 is disposed between the rotating mirror 26 and the image-forming optical system, folding the optical path to reduce the size of the system. In this case, the image-forming optical system includes two lenses (image-forming lenses). However, in some embodiments, the image-forming optical system may include a single lens or three or more lenses. Alternatively, in some embodiments, a mirror optical system may be employed for the image-forming optical system.

Referring to FIG. 1, the detection system 40 includes a first light detector 43 (sometimes referred to simply as a light detector) and a first binarizing circuit 44 (comparator).

Figure 3:
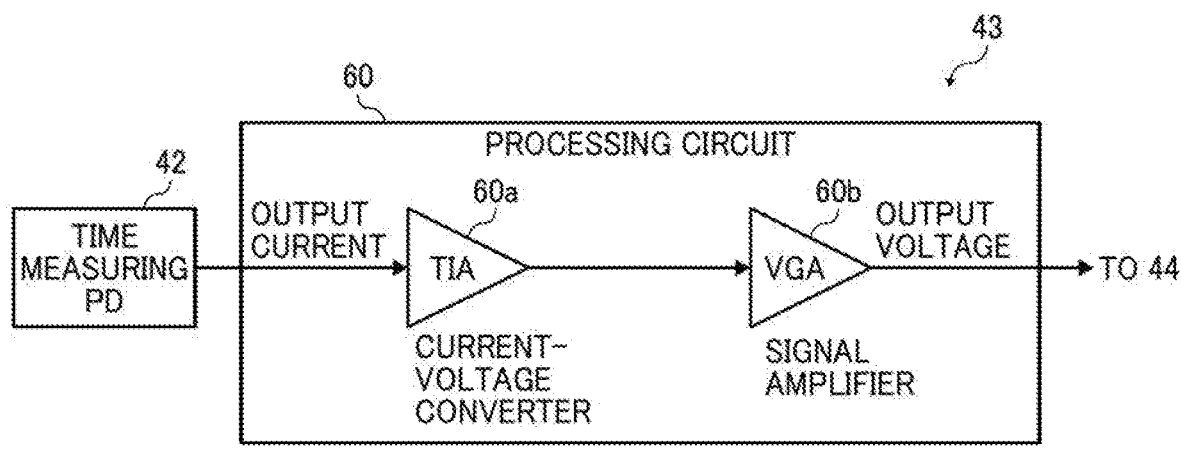
FIG. 3 is an illustration of a configuration of a light detector.

FIG. 3 is an illustration of a configuration of the first light detector 43.

As illustrated in FIG. 3, the first light detector 43 includes the time measuring PD 42 (photodiode) as a light-receiving element and a processing circuit. The time measuring PD 42 receives light that has been emitted from the projection optical system 20 and reflected (or scattered) by an object within the effective scan area, and has passed through the light receiving optical system 30.

Figure 4:
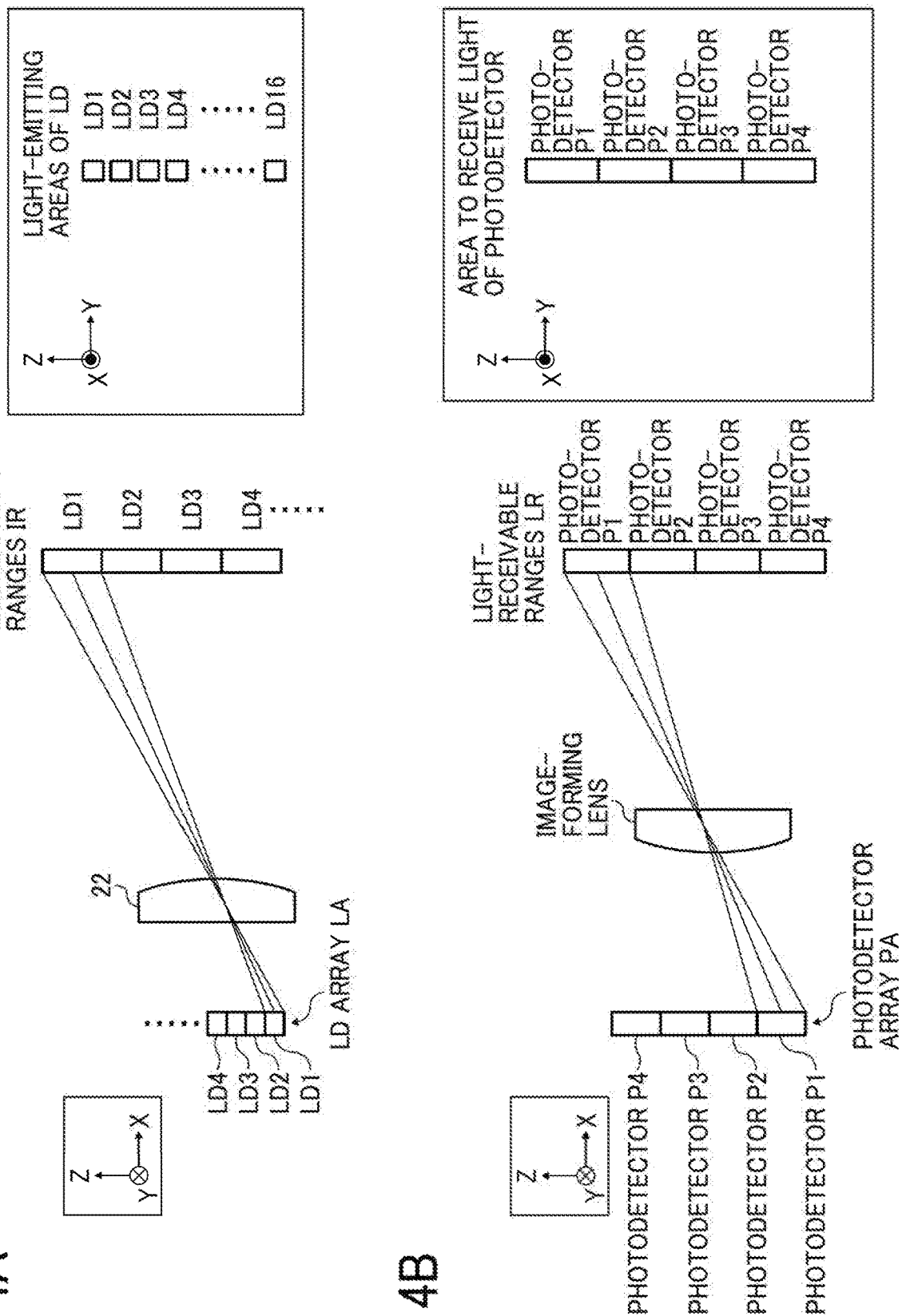
FIG. 4A is an illustration of a plurality of laser diodes corresponding to a plurality of illumination ranges, respectively.
FIG. 4B is an illustration of a plurality of photodetectors corresponding to a plurality of light-receivable ranges, respectively.

Referring to FIGS. 4A and 4B, the processing circuit 60 includes a current-voltage converter 60a, such as a Transimpedance Amplifier (TIA), and a signal amplifier 60b such as a high-linearity analog variable-gain amplifier (VGA). The current-voltage converter 60a converts the output current (current value) from the time measuring PD 42 into a voltage signal (vintage value). The signal amplifier 60b amplifies the voltage signal output from the current-voltage converter 60a.

The first binarizing circuit 44 binarizes an analog voltage signal output from the first light detector 43 of the first light detector 43 based on a threshold voltage value and outputs the binarized signal (digital signal) as a detected signal to the time measuring device 45.

Referring to FIG. 1, the synchronous system 50 includes a second light detector 53 and a second binarizing circuit 56.

As illustrated in FIGS. 1 and 2A, the second light detector 53 includes a synchronization lens 52, a synchronization detection PD 54 as another light-receiving element, and another processing circuit. The synchronization lens 52 is disposed in an optical path of light that is emitted from the light source 10 (the laser diode LD) and passes through the coupling lens 22 to be reflected by the reflection mirror 24 and deflected by the rotating mirror 26, coming back to the reflection mirror 24 to be reflected thereby again. The synchronization detection PD 54 is disposed on the optical path of the fight having passed through the synchronization lens 52. The described-above another processing circuit processes electric current output from the synchronization detection PD 54. The described-above another processing circuit 60 of the second light detector 53 has the same configuration as that of the processing circuit 60 of the first light detector 43.

Specifically, the reflection mirror 24 is disposed upstream from the range of deflection in the direction of rotation of the rotating mirror 26. The light deflected by the rotating mirror 26 toward upstream from the range of deflection enters the reflection mirror 24. The light deflected by the rotating mirror 26 and reflected by the reflection mirror 24 passes through the synchronization lens 52 and enters the synchronization detection PD 54. Then, the synchronization detection PD 54 outputs the electric current to another processing circuit in the second light detector 53.

Note that, in some embodiments, the reflection mirror 24 may be disposed downstream from the range of deflection in the direction of rotation of the rotating mirror 26. Further, the synchronous system 50 may be disposed in the optical path of the light deflected by the rotating mirror 26 and reflected by the reflection mirror 24.

The rotating mirror 26 rotates to guide the light reflected by the reflection plane of the rotating mirror 26 to the reflection mirror 24, and the light reflected by the reflection mirror 24 enters the synchronization detection PD 54. The synchronization detection PD 54 having received the light outputs electric current, which occurs upon each receipt of light. That is, the synchronization detection PD 54 periodically outputs electric current to the second binarizing circuit 56.

The light emission for synchronization described above, which irradiates the synchronization detection PD 54 with light deflected by the rotating mirror 26, allows obtaining the timing of rotation of the rotating mirror 26 based on the timing at which the synchronization detection PD 54 receives light.

With elapse of a predetermined length of time after the light source 10 (the laser diode LD) emits light for synchronization, the light source 10 emitting pulsed light allows the effective scan area to be optically scanned. That is, the light source 10 emits pulsed light during a period of time before and after the timing of illuminating the synchronization detection PD 54, thereby optically scanning the effective scan area.

In this case, examples of the light-receiving element for measuring time and detecting synchronization include a photo diode (PD) as described above, an avalanche photo diode (APD), and a single photon avalanche diode (SPAD) as a Geiger mode APD. The APD and the SPAD have higher sensitivity than a PD, and thus is advantageous in accuracy of detection or the detection distance.

The second binarizing circuit 56 binarizes an analog voltage signal output from the processing circuit of the second light detector 53 based on a threshold voltage value and outputs the binarized signal (digital signal) as a detected signal to the measurement controller 46.

The measurement controller 46 generates an LD drive signal based on the synchronization signal from the second binarizing circuit 56, and outputs the LD drive signal to the LD drive circuit DC and the time measuring device 45.

That is, the LD drive signal is a light-emission control signal (periodic pulsed signal) which is delayed relative to the synchronization signal.

When receiving the LD drive signal, the LD drive circuit DC applies a drive current to the light source 10 (the laser diode). The light source 10 then output pulsed light. In this case, the duty of the pulsed light emitted from the light source 10 (the laser diode LD) is restricted in consideration for the safety and durability of the light source 10. This is why the pulse width of the pulsed light emitted from the light source 10 is preferably narrower. The pulse width is generally set in a range from approximately 10 ns through approximately several dozen ns. The pulse interval is approximately several dozen microseconds in general.

The time measuring device 45 calculates a difference in input timing between the input timing of the LD drive signal output power from the measurement controller 46 and the input timing of the detected signal (binarized signal) output from the first binarizing circuit 44, as a time difference between the timing of light emission of the light source 10 (the laser diode LD) and the timing of light reception of the time measuring PD 42, outputting the calculated time difference (a time measurement result) to the measurement controller 46.

The measurement controller 46 converts the measurement result of the time measuring device 45 into distance to obtain a round-trip distance to and from an object, and outputs one-half of the round-trip distance as distance data to the object recognizer 47.

The object recognizer 47 recognizes the position of an object based on a plurality of sets of distance data obtained by one or more scans, outputting an object recognition result to the measurement controller 46. The measurement controller 46 transfers the object recognition result to the ECU.

The ECU performs, based on the transferred object recognizer, steering control of a vehicle, such as auto-steering, and speed control, such as auto-braking.

A description is given below of an example of the object detector 100 that includes an LD array LA and a photodetector array PA. The LD array LA includes a plurality of laser diodes LD disposed in an array along the Z-axis direction. The photodetector array PA includes a plurality of photodetectors P disposed in an array along the Z-axis direction.

FIG. 4A is an illustration of the laser diodes corresponding to the illumination ranges, respectively. FIG. 4B is an illustration of photodetectors corresponding to a light-receivable ranges LR, respectively. In FIG. 4B, the image-forming optical system is constituted by one image-forming lens.

As illustrated in FIG. 4A, a coupling lens 22 is disposed in the optical path of light emitted from the LD array LA, thereby causing a plurality of light beams emitted from the plurality of laser diodes to illuminate a plurality of different areas (illumination ranges IR), respectively along the Z-axis direction of an object.

As illustrated in FIG. 4B, the light beams, which have been emitted from the LD array LA and reflected or scattered by the object, pass through the image-forming lens to enter the photodetector array PA. Thus, the plurality of photodetectors P can receive the plurality of light beams having passed through a plurality of different areas (light-receivable ranges LR) along the Z-axis direction of the object.

Figure 5:
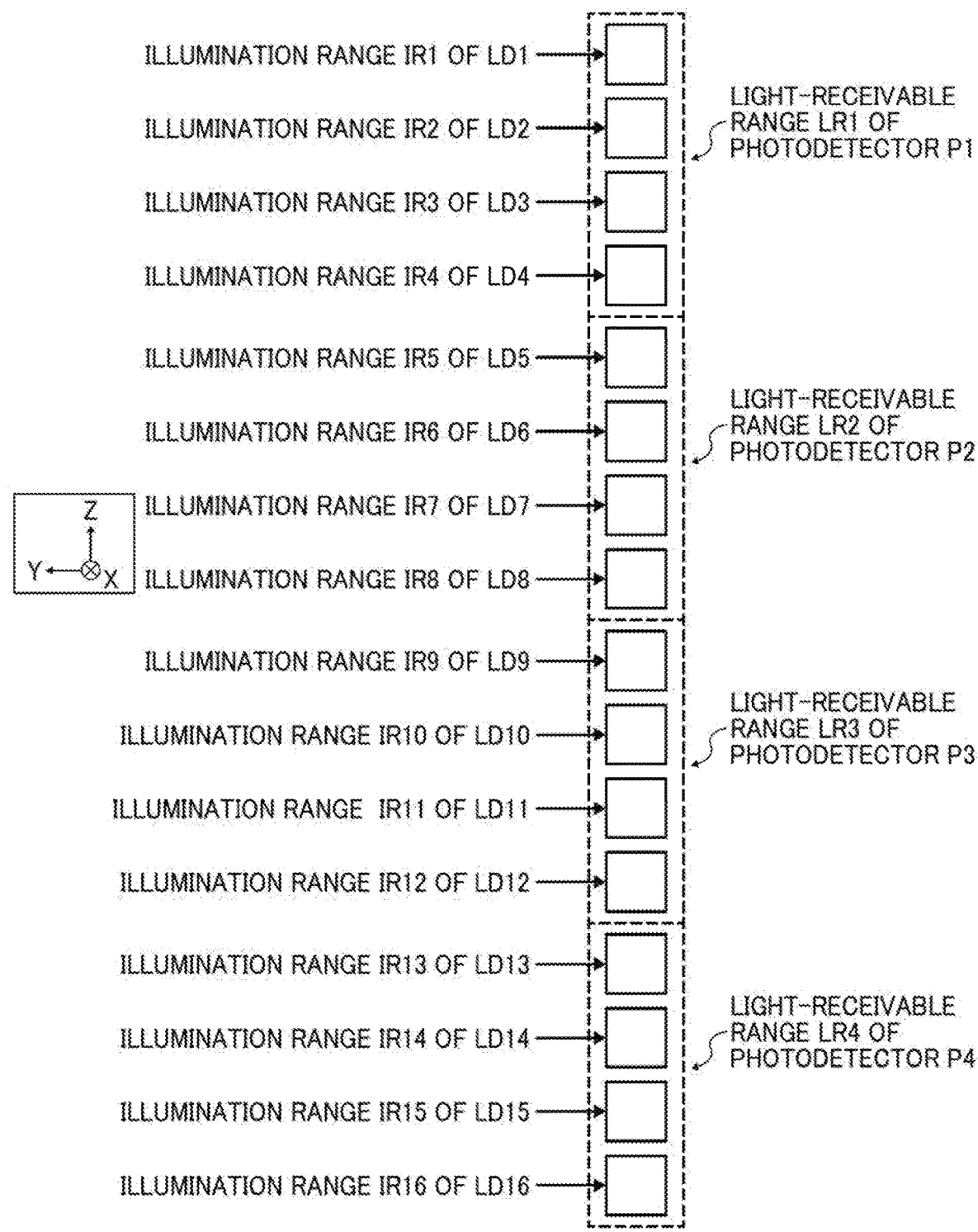
FIG. 5 is an illustration of a plurality of illumination ranges of a plurality of laser diodes corresponding to a plurality of light-receivable ranges of a plurality of photodetectors, respectively.

FIG. 5 is an illustration of a relation between the light-receivable ranges LR1 through LR4 of the photodetectors P1 through P4 and the plurality of illumination ranges IR1 through IR16 of a plurality of laser diodes LD1 through LD16 over an object to be detected.

In the present embodiment, the LD array LA includes sixteen laser diodes LD1 through LD16, and the photodetector array PA includes four photodetectors P1 through P4 as described above. The sixteen laser diodes LD1 through LD16 are disposed in the Z-axis direction from −Z side to +Z side. The four photodetectors P1 through P4 are disposed in the Z-axis direction from −Z side to +Z side. The illumination ranges IR1 through IR4 of the laser diodes LD1 through LD4 correspond to the light-receivable range LR1 of the photodetector P1. The illumination ranges IR1 through IR4 of the laser diodes LD1 through LD4 correspond to the light-receivable range LR1 of the photodetector P1. The illumination ranges IR5 through IR8 of the laser diodes LD5 through LD8 correspond to the light-receivable range LR2 of the photodetector P2. The illumination ranges IR9 through IR12 of the laser diodes LD9 through LD12 correspond to the light-receivable range LR3 of the photodetector P3. The illumination ranges IR13 through IR16 of the laser diodes LD13 through LD16 correspond to the light-receivable range LR4 of the photodetector P4. In this case, a single laser diode LD, which is a laser-diode group constituted by the four laser diodes corresponding to the respective photodetectors, may emit light at the same time.

In the present embodiment, the illumination ranges IR1 through IR4 of the four laser diodes LD1 through LD4 correspond to the light-receivable range LR1 of one photodetector P1. Alternatively, in some embodiments, the light-receivable range LR1 of one photodetector P1 may correspond to the illumination ranges IR1 through IR16 of sixteen laser diodes LD1 through LD16.

In the present embodiment, one light-receivable range, e.g., LR1, is slightly larger than the sum of the illumination ranges, e.g., IR1 through IR4, of four laser diodes, e.g., LD1 through LD4. This configuration allows illuminating a light-receivable range LR effectively, thereby increasing the amonnt of light in the light-receivable range IR, which is advantageous for the accuracy of detection and for the detection distance. Further, such a configuration can present a reduction in accuracy of detection and detection distance even with a slight misalignment of the illumination range IR and the light-receivable rangy LR within manufacturing error.

Figure 6:
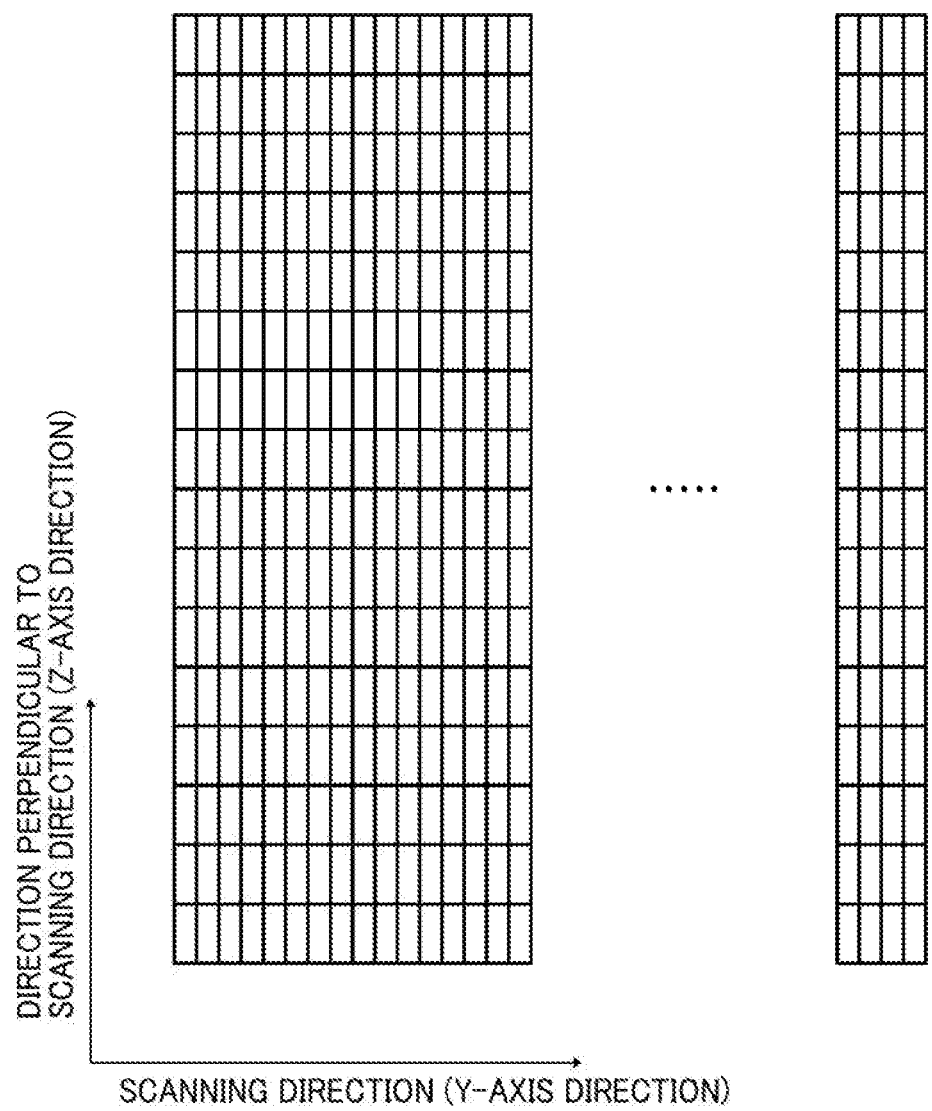
FIG. 6 is a schematic view of resolution of an object to be detected in a scanning direction and a vertical scanning direction.

FIG. 6 is a schematic view of YZ two-dimensional resolution of an object in the Y-axis directional scanning of the object with light emitted from the LD array LA. In FIG. 6, a minimum rectangular represents an area (resolution) to be measured tor each measurement. Reducing the light-emitting interval of the laser diode LD can increase the resolution in the Y-axis direction. Increasing the number of laser diodes LD or photodetectors P can increase the resolution in the vertical scanning direction (the Z-axis direction). However, the increase in the number of laser diodes LD is more advantageous from the viewpoint of increasing the detection distance than the increase in the number of photodetectors P. Note that, the resolution in the vertical scanning direction is 16 in FIG. 6.

Example 1

Figure 7:
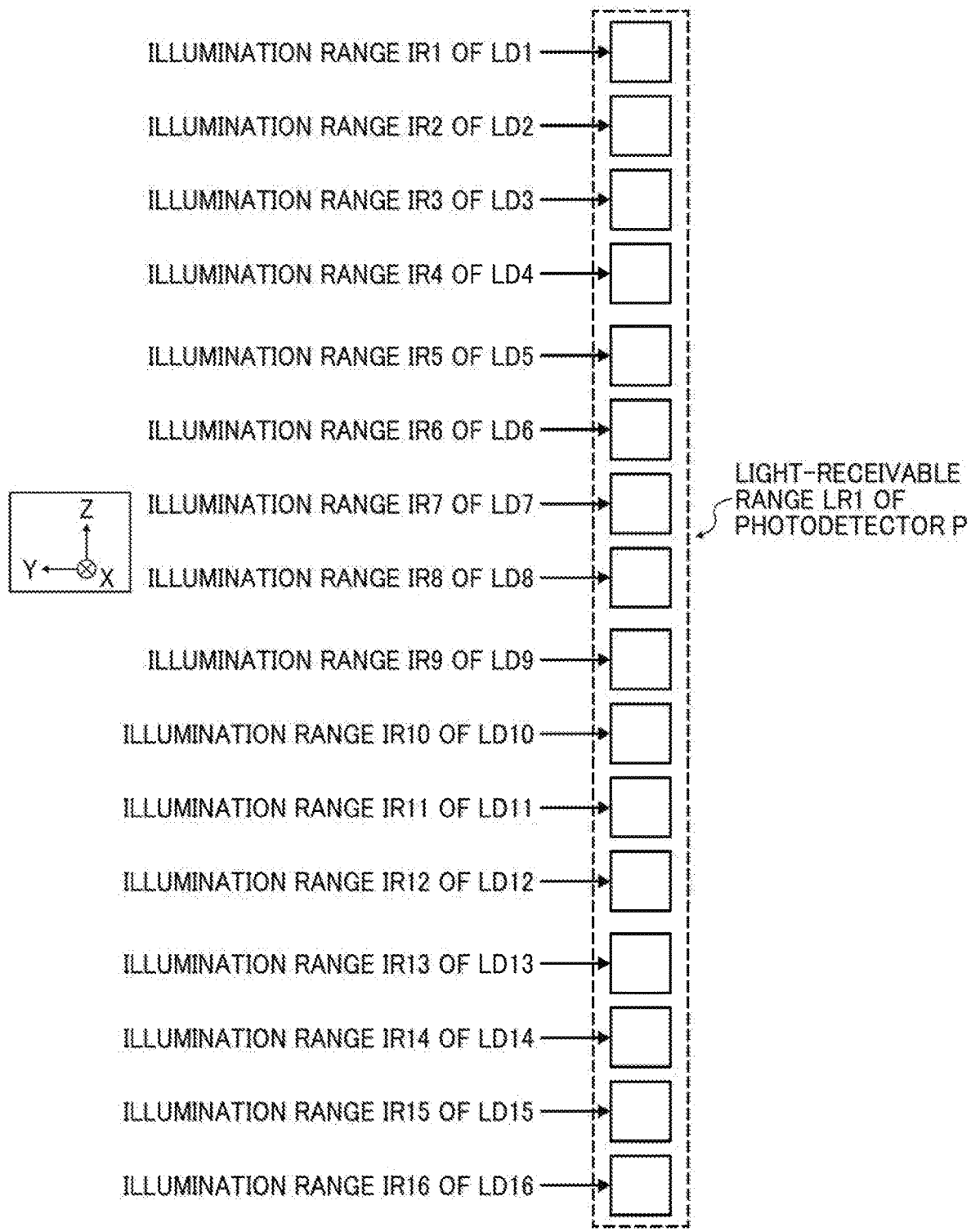
FIG. 7 is an illustration of a plurality of illumination ranges of a plurality of laser diodes corresponding to a single light-receivable range of a single photodetector according to Examples 1.

FIG. 7 is an illustration of an example configuration of sixteen laser diodes LD1 through LD16 and one photodetector in the object detector 100 according to Example 1. More specifically, the illumination range IR1 through IR16 of the sixteen laser diodes LD1 through LD16 correspond to the light-receivable range LR1 of the photodetector P1 in Example 1.

In such a configuration of Example 1 (sixteen laser diodes LD1 through LD16 correspond to one photodetector P1), the sixteen laser diodes LD1 through LD16 emit light at different timings, so that the photodetector P1 receives the light reflected or scattered by an object at different timings.

Figure 8:
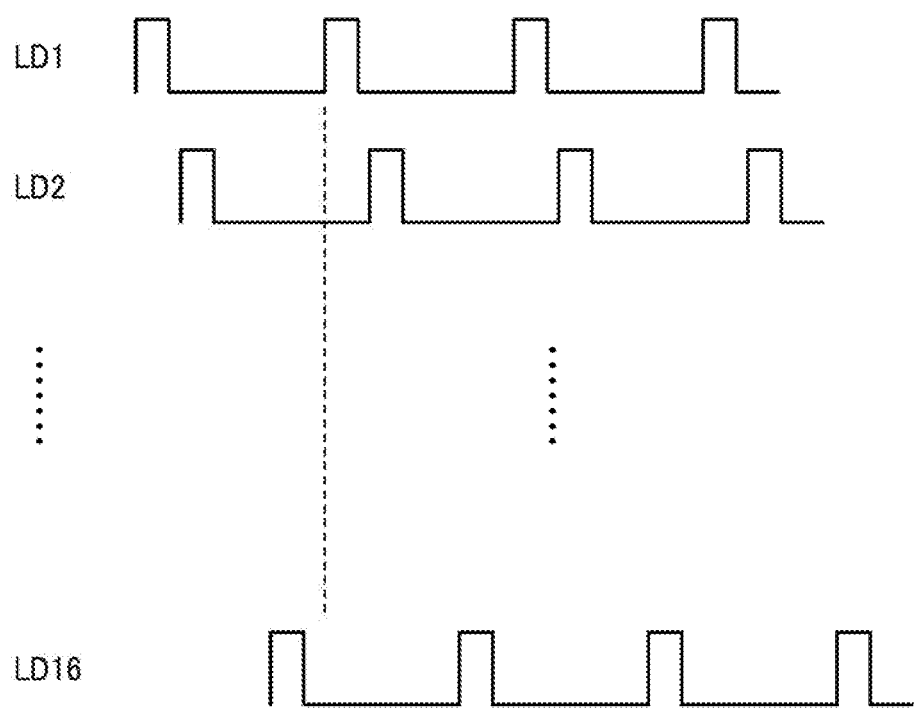
FIG. 8 is a timing chart of the timing of light emission of the plurality of laser diodes according to Example 1.

FIG. 8 is a timing chart of the light-emitting timings of the sixteen laser diodes LD1 through LD16 according to Example 1. As illustrated in FIG. 8, the laser diodes LD1 through LD16 sequentially emit light so that the light-emitting timings of the laser diodes LD1 through LD16 do not coincide with each other.

FIG. 9 is an illustration of a relation between the illumination range IR and the detection distance. In FIG. 9, the object detector 100 includes the LD array LA including the sixteen laser diodes LD1 through LD16 disposed along the Z-axis direction to emit light. In the present Example, the object detector 100 is disposed at 0.5 meter (m) in height of the vehicle. In FIG. 9, the line at 0.0 m represents the height of the ground.

In FIG. 9, the longitudinal axis represents a vertical-directional (Z-axis directional) position, and the lateral axis represents a distance (X-axis directional distance) from the object detector 100 to an object detection. The plurality of lines radially extending from a point at 0.5 m (the position of the object detector 100) in vertical-directional position of FIG. 9 represent border lines that define the detection angle ranges of the object detector 100. Each detection angle range is 0.5 degree (deg) in the vertical direction. The laser diodes LD1 through LD16 arranged in a direction from −Z side to +Z side corresponds to the illumination ranges IR1 though IR16. In other words, the illumination ranges IR1 through IR16 are arranged in a direction horn +Z side to −Z side.

As illustrated in FIG. 9, the ground is present between the object detector 100 and the position at a detection distance of 30 m for the illumination ranges IR10 through IR16, which means that there is no need for the object detector 100 to detect an area at a detection distance of 30 m or more within the illumination ranges IR 10 through IR16. Thus, with an increase in reference number of the illumination range IR (as the vertical-directional position of the illumination range IR decreases), the distance to be detected decreases.

To increase the detection distance, the amount of light to reach (illuminate) the illumination range IR (hereinafter, referred to as illumination amount) is increased. With an increase in illumination amount, the object detector 100 can detect an object as a distance of greater than or equal to 30 m from the object detector 100 within the illumination ranges IR1 through IR9.

By contrast, the illumination amount is not preferably increased for the illumination ranges IR10 through IR16 for which increasing the detection distance is unnecessary. With an increase in illumination amount even though such an increasing operation is unnecessary, ghost light and stray light are generated, resulting in erroneous detection or adversely affecting the detection performance.

Accordingly, the amount of light (illumination amount) emitted from the object detector 100 to reach (illuminate) the illumination range IR preferably differs between the illumination ranges IR. To change the illumination amount for each illumination range IR, for example, the amount of light emission may differ between laser diodes LD.

In the present Example, the illumination amounts (for example, the light-emitting amounts of the laser diodes LD1 through LD9) for the illumination ranges IR1 through IR9 are increased to be greater than the illumination amounts (the light-emitting amounts of the laser diodes LD10 through LD16) for the illumination ranges IR10 through IR16. Such a configuration can prevent the occurrence of any erroneous detection in the illumination ranges IR10 through IR16 while achieving an increase in detection distance in the illumination ranges IR1 through IR9.

Note that there is no need to change the illumination amount for each illumination range IR. In some embodiments, at least one illumination range IR may differ in illumination amount from other illumination range IR other than the at least one illumination range IR, thus exhibiting the above-described advantageous effects unlike in the case in which all of the illumination ranges IR are common in light-emitting amount.

Example 2

Figure 10A:
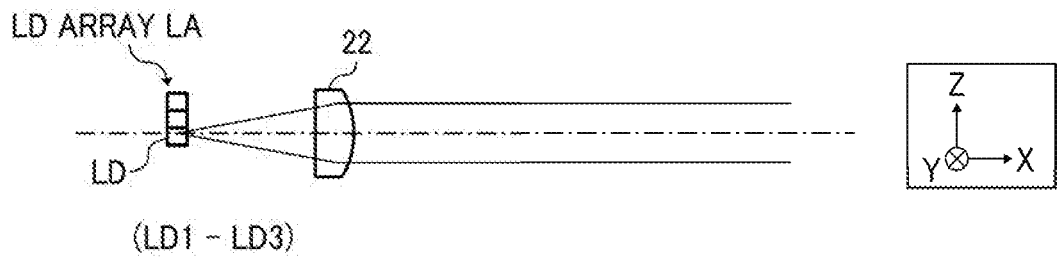
FIGS. 10A and 10B each is an illustration of a configuration according to Example 2 of the present disclosure.
Figure 10B:

To change the illumination amount between the illumination ranges IR, light loss is caused in the optical path of light emitted from the LD array LA, reflected or scattered by an object, and returned to the object detector 100 as illustrated in FIGS. 10A and 10B for example.

In Example 2, a coupling lens 22 is used to cause the loss of some light beams as illustrated in FIG. 10. Its the present Example, the LD array LA includes, for example, three laser diodes.

In FIG. 10A, the laser diode LD, which is disposed near the optical axis of the coupling lens 22, emits light beams, and the emitted light beams pass through the coupling lens 22, resulting in little or none of the light loss.

In FIG. 10B, the laser diode LD, which is disposed away from the optical axis of the coupling lens 22, emits light rays, and the emitted light rays pass through the coupling lens 22, resulting in light loss.

That is, each laser diode emits light rays that diverge at a predetermined angle. Some of the light rays emitted from the laser diode, which is disposed away from the optical axis of the coupling lens 22, fails to pass through the coupling lens 22, resulting in light loss (loss of illumination amount).

Such a configuration in Example 2 allows changing, for each illumination range IR, the amount (illumination amount) of light emitted from the object detector 100 to reach the illumination range IR even when a plurality of laser diodes LD of the object detector 100 has the same light-emitting amount. When the plurality of laser diodes LD has the same light-emitting amount, a control operation can be simplified and the LD drive circuit DC can also be simplified and reduced in size. Accordingly, the coupling lens 22 can be reduced in diameter, thus achieving a reduction in size of the object detector 100.

Example 3

In FIG. 9, as the reference number of illumination ranges IR increases, the distance to be detected decreases, thus reducing the amount of light used for detection. In the case of FIG. 9, the illumination ranges IR10 through IR16 on the lower side detect the ground surface, and accordingly the light emitted from the laser diodes LD10 through LD16 corresponding to the illumination ranges IR10 through IR16 may be reduced in amount by causing the light loss, to reduce the illumination amount for the illumination ranges IR10 through IR16.

Figure 11:
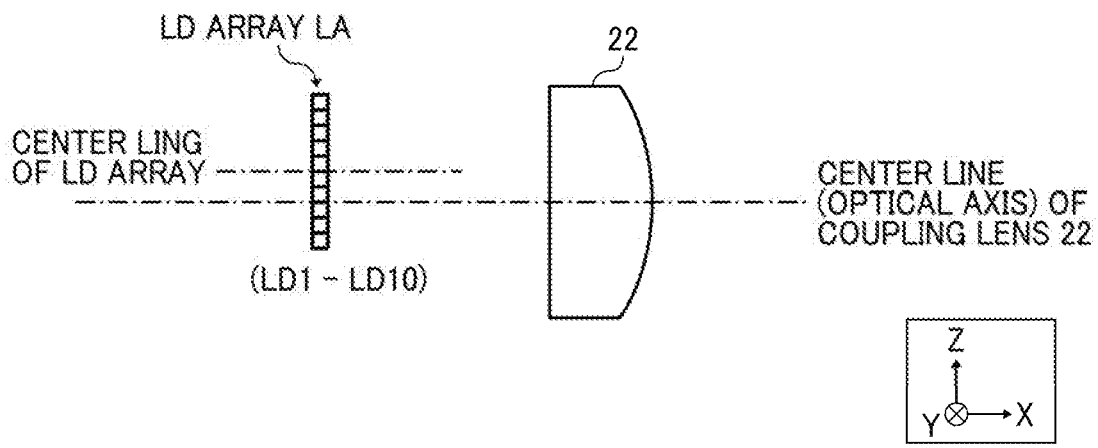
FIG. 11 is an illustration of a configuration according to Example 3 of the present disclosure.

To achieve the above, the center of the LD array LA is displaced relative to the center (optical axis) of the coupling lens 22 in Example 3 as illustrated in FIG. 11. More specifically, the center of the LD array LA is disposed on the +Z side of the coupling lens 22. In the present Example, the LD array LA includes, for example, ten laser diodes LD1 through LD10.

The configuration according to Example 3 can increase the amount of loss of light emitted from any laser diodes LD (with larger reference numbers on the upper side) disposed away from the optical axis of the coupling lens 22, thus reducing the illumination amounts for the illumination ranges IR with larger reference numbers on the lower side.

More specifically, the light emitted from the laser diodes LD10 through LD16 corresponding to the illumination ranges IR10 through IR16 is reduced in amount by causing the light loss, thus reducing the detection distance in the illumination ranges IR10 through IR16 relative to the detection distance in the illumination ranges IR1 through IR9.

Example 4

Figure 12A:
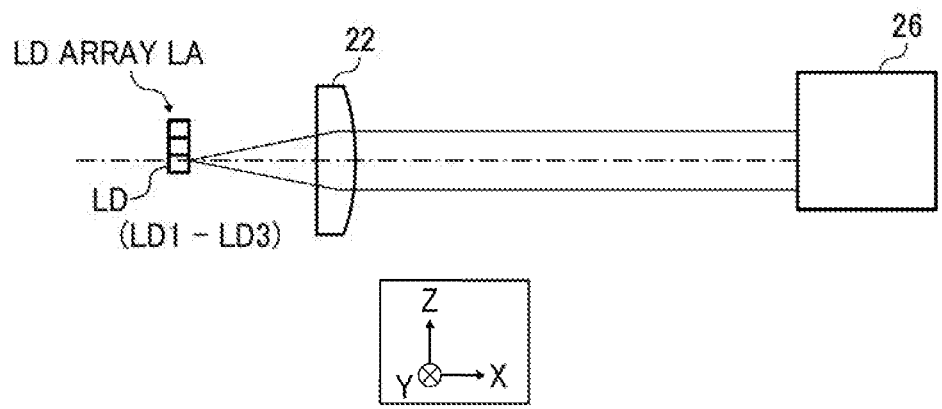
FIGS. 12A and 12B each is an illustration of a configuration according to Example 4 of the present disclosure.
Figure 12B:
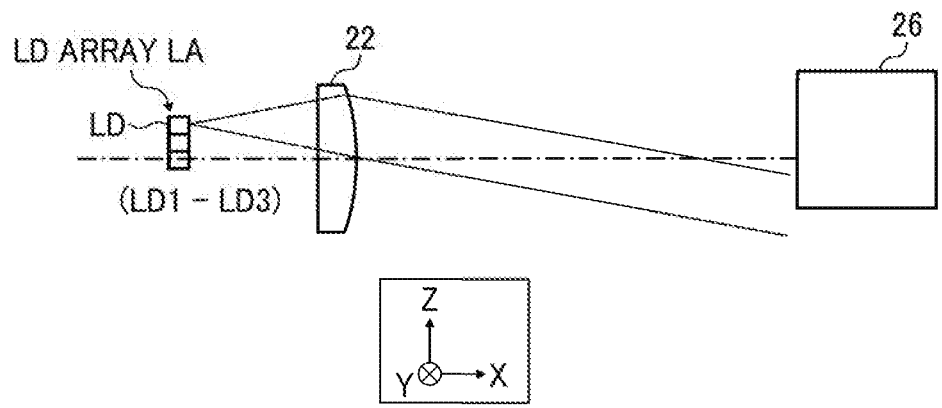

A description is given of a configuration according to Example 4, referring to FIGS. 12A and 12B. The light loss may be caused by light passing through other element other than the coupling lens 22. In the present Example, the light loss is caused by light passing the rotating mirror 26 as a light deflector.

In FIG. 12A, the laser diode, which is disposed near the optical axis of the coupling lens 22, emits light, and the emitted light passes through the coupling lens 22 to reach the rotating mirror 26, causing no light loss. In FIG. 12B, the laser diode, which is disposed away from the optical axis of the coupling lens 22, emits light rays, and some of the emitted light rays having passed through the coupling lens 22 fail to hit the rotating mirror 26, resulting in light loss. In the present Example, the LD array LA includes, for example, three laser diodes LD1 through LD3.

In the configuration according to Example 4, each illumination range IR is displaced along the arrangement direction (Z-axis direction) of the laser diodes LD. Such a displacement shifts the position at which the emitted light rays strike the rotating mirror 26, thereby some light rays fading to strike the rotating mirror 26, thus causing the light loss. The configuration according to Example 4 allows the rotating mirror 26 to decrease in size in the height direction, thus successfully reducing the size of the object detector 100 in the height direction.

To change the illumination amount for each illumination range IR, the light-emitting amount may be changed between the light-emitting elements LE (for example, laser diodes) as described above. That is, the light-emitting amount of any light-emitting element LE corresponding to the illumination range IR, for which little amount of light is used, is reduced, thereby successfully reducing power consumption.

Example 5

Figure 13:
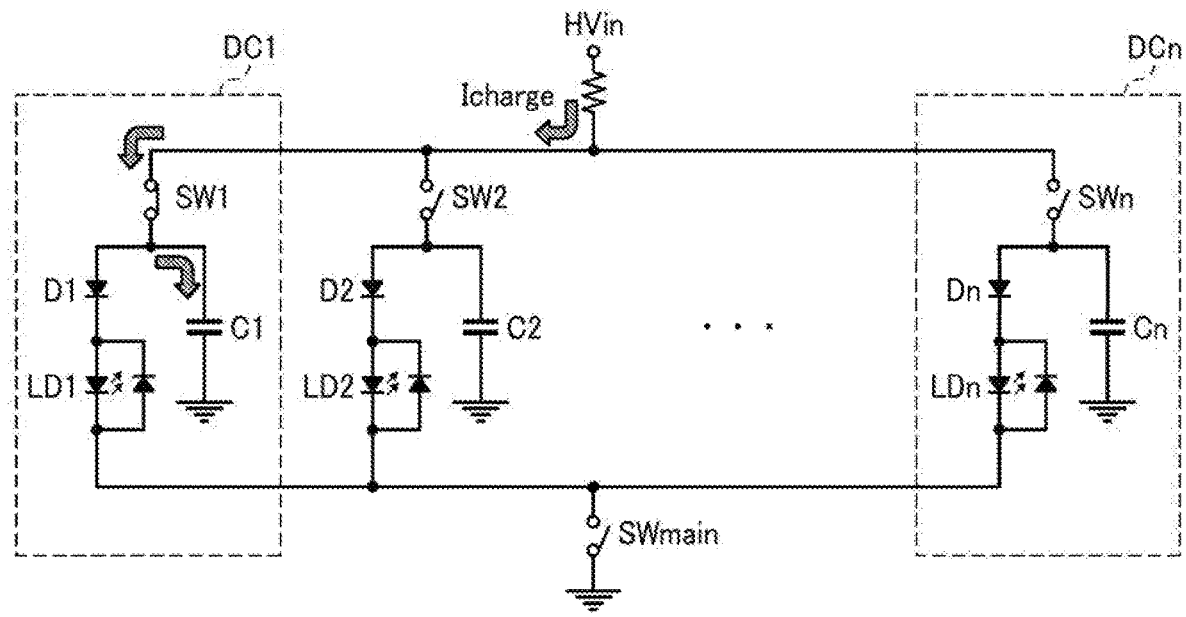
FIG. 13 is a circuit diagram for describing a configuration according to Example 5 of the present disclosure.
Figure 14:
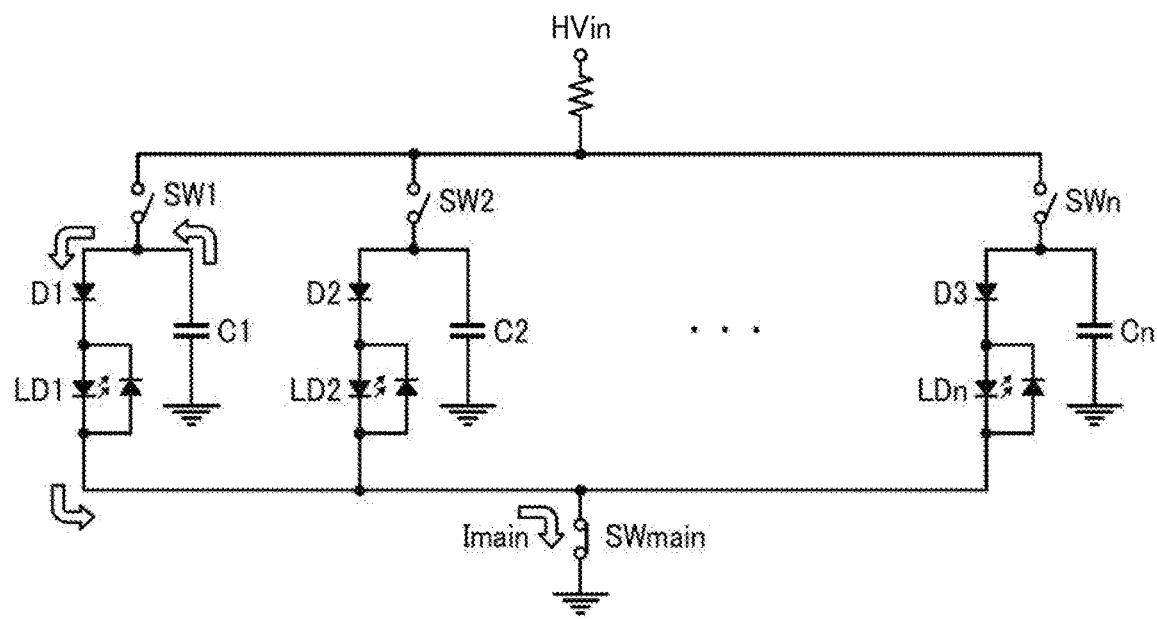
FIG. 14 is another circuit diagram for describing the configuration according to Example 5 of the present disclosure.

A description is given of a configuration according to Example 5 in which a LD drive circuits DC is used to change the light-emitting amount between the light-emitting elements LE in the light-emitting element array 10a, referring to FIGS. 13 and 14.

In Example 5, each light-emitting element array 10a includes n light-emitting elements LE (laser diodes or vertical-cavity surface-emitting lasers (VCSEL)). As the light-emitting element array 10a, the LD array or the VCSEL array is used. Each light-emitting element LE includes at least one capacitor C.

Hereinafter, cases in which the LD array LA is employed as the light-emitting element array 10a are described. The same applies to cases in which the VCSEL array is employed.

In Example 5, n LD drive circuits DC1 through DCn are disposed for n laser diodes LD1 through LDn, respectively in the LD array LA. The laser diode LDk (k: 1 through n) refers to any laser diode among the n laser diodes LD1 through LDn. The LD drive circuit DCk (k: 1 through n) refers to any LD drive circuit DC among the n LD drive circuits DC1 through DCn.

The LD drive circuits DC1 through DCn are selectively connected to a voltage source at one terminal through n switches SW1 through SWn, respectively. The LD drive circuits DC1 through DCn are electrically grounded through a switch SWmain at the other terminal. The switch SWk (k; 1 through n) refers to any switch among n switches SW1 through SWn. Examples of the switch SWk include, for example, a transistor, such as a bipolar transistor and a field-effect transistor (FET).

In the present Example, the measurement controller 46 applies a LD drive signal to a base (when the switch SWk is the bipolar transistor) or a gate (when the switch SWk is the FET) of the switch SWk (k: 1 through n) corresponding to the laser diode LDk to emit light. The switch SWk remains ON while receiving the LD drive signal, which is high level, from the measurement controller 46.

The LD drive circuit DCk includes a diode Dk (k: 1 through n) and a capacitor Ck (k: 1 through n). One electrode of the capacitor Ck is connected to the anode of the laser diode LD through the diode Dk and the other electrode is electrically grounded.

The following describes an operation of a circuit including the n LD drive circuits DCk (k: 1 through n) according to Example 5. The switch SWmain is originally OFF (open). Firstly, the measurement controller 46 applies a high voltage (HVin) to the LD drive circuit DCk to electrically charge the capacitor Ck after turning on the switch SWk (closed), as illustrated in FIG. 13. FIG. 13 is a circuit diagram for describing an example in which the measurement controller 46 electrically charges a capacitor C1.

Subsequently, the measurement controller 46 flows the electric charge accumulated in the capacitor Ck to the laser diode LDk after turning on the switch SWmain (closed) and turning off the switch SWk (open). Accordingly, the laser diode LDk is capable of emitting light having a small pulse width and a high output power. In this case, the pulse width ranges from several nanoseconds (ns) to several tens ns, and a peak output power ranges from several tens watt (W) to several hundreds W.

The peak output power is determined by the capacitance of the capacitor Ck. With a decrease in capacitance of the capacitor Ck, the peak output power decreases. With an increase in capacitance of the capacitor Ck, the peak output power increases.

Figure 15:
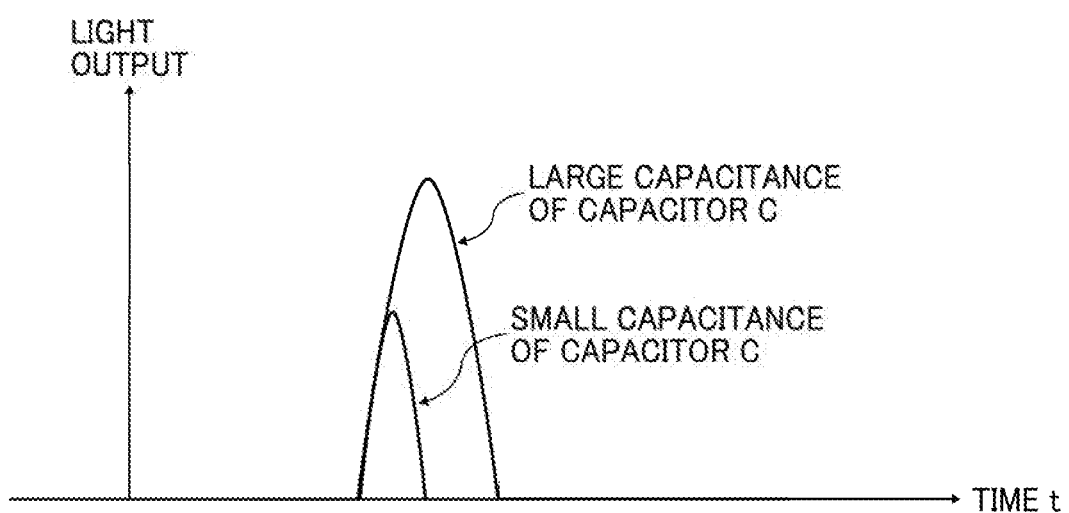
FIG. 15 is a graph for describing the configuration according to Example 5 of the present disclosure.

FIG. 15 is a waveform chart of light emitted from two laser diodes LD each having a different capacitance for a capacitor C. As described above, changing the capacitance of each capacitor allows the laser diodes LD to differ in light-emitting amount. Thus, a simplified LD drive circuit DC can be achieved while reducing the size of a circuit board.

Example 6

As illustrated in FIGS. 16A through 16C according to Example 6, a plurality of (n) light-emitting elements LE (for example, laser diodes LD or VCSELs) are disposed in the Z-axis direction, each including a plurality of light-emitting sections LS, thus constituting a light-emitting section array. In FIGS. 16A through 16C, a minimum rectangular represents each light-emitting element LE, and a plurality of black dots in each rectangular respectively represents light-emitting sections LS. In the present Example, each light-emitting section LS is preferably the VCSEL, which facilitates a two-dimensional arrangement of the light-emitting sections LS. Accordingly, increasing the number of light-emitting sections LS in a two-dimensional manner facilitates an increase in output power, and changing the number of light-emitting sections LS facilitates a change in output power to a desired degree. That is, the VCSEL, which facilitates the two-dimensional arrangement, is preferably used.

In the present Example, the light-emitting section LS differs in number between the light-emitting element LE to change the illumination amount for each illumination range IR. FIGS. 16A through 16C each is an illustration of an example in which the number of the light-emitting sections LS is adjusted. In FIG. 16A, the light-emitting sections LS uniformly decreases in number in a direction from the −Z side to the +Z side. In FIG. 16B, the light-emitting sections LS alternately decreases in number between the upper end and the lower end in a direction from the −Z side to the +Z side. In FIG. 16C, the light-emitting sections LS decreases in number starting from one side in the Y-axis direction, in a direction front the −Z side to the +Z side. The configuration illustrated in FIG. 16A is effective in evenly detecting the illumination range. The configurations illustrated in FIGS. 16B and 16C are effective in detecting particular some of the illumination range.

Figure 17:
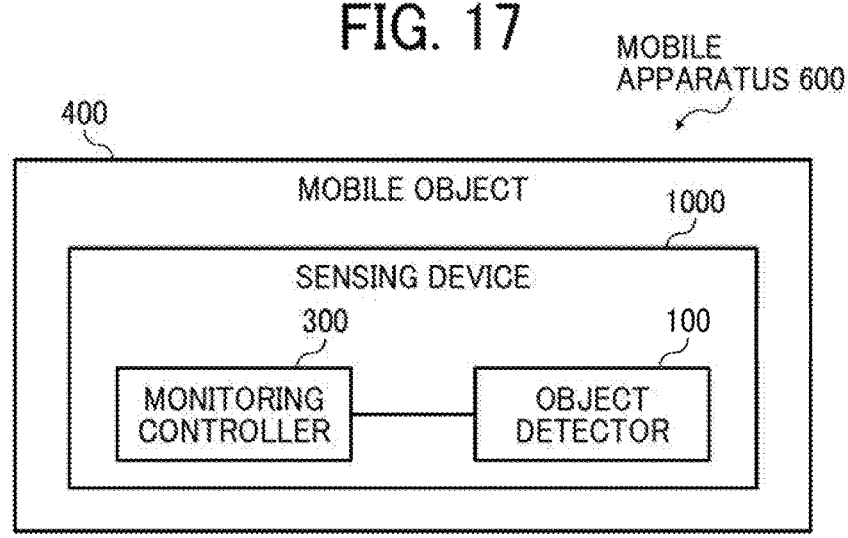
FIG. 17 is an illustration of a sensing device.

FIG. 17 is a schematic view of a sensing device 1000 with the object detector 100. The sensing device 1000, which is mounted on a mobile object 400, includes the object detector 100 and a monitoring controller 300 electrically connected to the object detector 100. The object detector 100 is mounted near a bumper or a rear-view mirror in a vehicle (the mobile object 400). The monitoring controller 300, based on the detection results of the object detector 100, estimates the size or shape of an object, and calculates the position and movement data of the object, recognizing the type of the object. The monitoring controller 300 ultimately judges presence of danger. The monitoring controller 300 having made an affirmative judgment alerts an operator of the mobile object 400 to the danger. Alternatively, the monitoring controller 300 having an affirmative judgment issues an order to a steering controller of the mobile object 400 to avoid the danger by steering, or issues an order to the ECU to brake the mobile object 400. Note that the sensing device 1000 receives power supply from a vehicle battery, for example.

Further, the monitoring controller 300 may be integrated with the object detector 100. Alternatively, in some embodiment, the monitoring controller 300 may be separate from the object detector 100. In some embodiments, the monitoring controller 300 may perform at least some of the control function of the ECU.

The above-described object detector 100 according to the present embodiments includes the light-emitting system 200 and a light-receiving system 500. The light-emitting system 200 includes the light source 10 (for example, the LD array LA and the VCSEL array) including a plurality of light-emitting elements LE, such as laser diodes LD, disposed in one-axis direction. The light-receiving system 500, which includes the light receiving optical system 30 and the first light detector 43, receives light emitted from the light-emitting system 200 and reflected or scattered by an object. The plurality of light-emitting elements LE emits a plurality of light beams to a plurality of different areas (illumination ranges IR). The amount of light (illumination amount) to reach (illuminate) some of the illumination ranges IR is different from the amount of light to reach (illuminate) other illumination range IR other than the some of the illumination ranges IR.

This configuration allows increasing the amount of light to reach (illuminate) any area (an illumination range IR) for which a detection distance is to be increased. Alternatively, this configuration allows reducing the amount of light to reach (illuminate) any area (an illumination range IR) for which any erroneous detection is to be prevented.

Thus, the configuration according to the present embodiments can achieve both an increase in detection distance and prevention of erroneous detection.

In the present embodiments, the above-described "one-axis direction" preferably refers to the vertical direction (the Z-axis direction). To exhibit the above-described advantageous effects, the object detector 100 reduces the amount of light to illuminate a road surface vertically below the object detector 100, and increases the amount of light to illuminate space vertically above the road surface.

Note that, in some embodiments, the above-described one-axis direction may be a horizontal direction (for example, the Y-axis direction). In the horizontal both ends of the projection range of the light-emitting system 200, an object to be detected is more likely to be present at a relatively short distance. In the center in the horizontal direction of the projection range of the light-emitting system 200, the object to be detected is more likely to be present at a relatively long distance. Accordingly, the object detector 100 may reduce the amount of light emitted to the horizontal both ends of the projection range of the light-emitting system 200, and may increase the amount of light emitted to the center in the horizontal direction of the projection range. With such a configuration, the above-described advantageous effects can be obtained.

Note that, in some embodiments, the above-described one-axis direction may be, for example, a direction oblique to the vertical direction.

Further, the light-emitting system 200 further includes an optical system (the projection optical system 20) to guide light beams emitted from a plurality of light-emitting elements LE, to the illumination range IR. Some of light rays emitted from at least one of the plurality of the light-emitting elements LE are lost while passing through the optical system.

Accordingly, the light-emitting amount can be common between the plurality of light-emitting elements LE. Thus, a control operation can be simplified and the circuit (the LD drive circuit DC) can be simplified and reduced in size.

The above-described optical system includes a coupling lens 22 disposed in the optical path of light emitted from the plurality of light-emitting elements LE. Some of light rays emitted from the at least one light-emitting element LE fails to pass through the coupling lens 22, and other light rays other than some of the light rays pass through the coupling lens 22.

Accordingly, the coupling lens 22 can be reduced in diameter, thereby achieving a reduction in size of the object detector 100.

Along the one-axis direction, the center of the light-emitting element array 10a may be displaced relative to the center (optical axis) of the coupling lens 22.

The above-described optical system includes a reflector. Preferably, some of the light rays emitted from the at least one light-emitting element LE fail to strike the reflector.

The above-described reflector is, for example, a rotating mirror 26 (light deflector) having a rotation axis parallel to, for example, the one-axis direction.

In this case, the rotating mirror 26 may decrease in size in the height direction.

In some embodiments, some of the light beams emitted from the at least one light-emitting element LE may be configured to fail to hit the reflection mirror 24 in addition to or instead of the rotating mirror 26.

In this case, the reflection mirror 24 may decrease in size in the height direction.

The light-emitting element LE differs in light-emitting amount between when emitting light to some of the plurality of illumination ranges IR and when emitting light to other illumination range IR other than the some of the plurality of illumination ranges IR.

This configuration can reduce power consumption.

The light-emitting system 200 further includes, for example, a plurality of drive circuits (for example, the LD drive circuit DCk) to drive a plurality of light-emitting elements LE (for example, the laser diode LDk), respectively. Each of the drive circuits includes a capacitor C to accumulate electric charge to be supplied to the corresponding light-emitting element LE. The capacitor C differs in capacitance between some of the plurality of drive circuits, which drive a corresponding some of the plurality of light-emitting elements LE, and other drive circuits other than the some of the plurality of drive circuits to drive a corresponding other light-emitting element LE other than the some of the plurality of light-emitting elements LE.

In this case, with the capacitor(s) that correspond to some of the light-emitting elements LE differing in capacitance from the capacitor(s) that correspond to other light-emitting element(s) other than the some of the light-emitting elements LE, the light-emitting amount may differ between some of the light-emitting elements LE and other light-emitting element LE other than the some of the light-emitting elements LE.

Such a configuration allows the LD drive circuit DC to be simplified and reduced in size.

In some embodiments, for example, some of the drive circuits may be connected to a voltage source that applies a different voltage than a voltage applied by another voltage source to which other drive circuit (other than the some of the drive circuits) is connected. With such a configuration, the light-emitting amount can differ between some of the light-emitting elements LE and other light-emitting element LE other than the some of the light-emitting elements LE.

Alternatively, in some embodiments, a plurality of drive circuits, each including a capacitor C and a resistor which are connected in series, may constitute a plurality of series connection bodies. A voltage may be applied to both terminals of each of the series connection bodies. In such a configuration, the capacitance of the capacitor is common in the some of the drive circuits and other drive circuit other than the some of the drive circuits. Further, the resistance of the resistor differs between the some of the drive circuits and other drive circuit other than the some of the drive circuits. Accordingly, the light-emitting amount can differ between some of the light-emitting elements LE and other light-emitting element LE other than the some of the light-emitting elements LE.

Each light-emitting element LE includes a plurality of light-emitting sections LS. The number of light-emitting sections LS for each light-emitting element LE differs between some of the light-emitting elements LE and other light-emitting element LE other than the some of the light-emitting elements LE.

In this case, the number of light-emitting sections LS for each light-emitting element LE differs between some of the light-emitting elements LE and other light-emitting element LE other than the some of the light-emitting elements LE. Such a configuration can change the light-emitting amount between some of the light-emitting element LE and other light-emitting element LE other than the some of the light-emitting elements LE.

In some embodiments, the light source 10 may include a plurality of light-emitting element arrays 10a each including a plurality of light-emitting elements LE. The plurality of light-emitting element arrays 10a is disposed along a direction perpendicular to the above-described one-axis direction. In other words, the object detector 100 may be a non-scanning LiDAR. The same advantageous effect as described above can be obtained by such a non-scanning LiDAR having the same configuration as that of the object detector 100 according to for example, Examples 1 through 3, 5, and 6.

According to the mobile apparatus 600 including the object detector 100 and the mobile object 400 equipped with the object detector 100, a safety mobile apparatus can be provided.

The sensing device 1000 includes the object detector 100 and the monitoring controller 300 to obtain object data including at least one of the presence of an object, the position of the object, the direction of movement of the object, and the speed of movement of the object based on the output of the object detector 100. Such a sensing device 1000 accurately obtains the object data.

The sensing device 1000 is mounted on the mobile object 400. The monitoring controller 300, based on at least one of the position data and the movement information of the object, determines the presence of danger, thereby providing effective data for avoiding danger to an operational control system and a speed control system of a mobile object 400, for example.

Further, a mobile apparatus 600 including the object detector 100 mounted on the mobile object 400 and the sensing device 1000 mounted on the mobile object 400 provides an excellent safety against impact.

—Variation of Object Detector—

Figure 18:
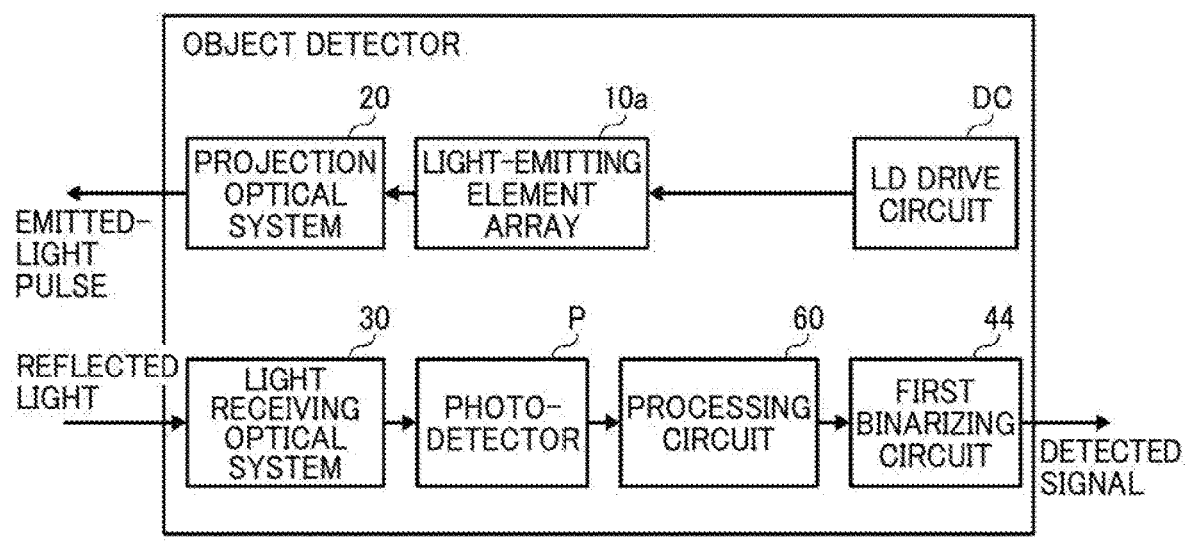
FIG. 18 is a block diagram of a configuration of an object detector according to a variation of the present disclosure.

FIG. 18 is a block diagram of a schematic configuration of the object detector 100 according to a variation of the present disclosure. The object detector 100 according to the present variation includes a light-emitting element array 10a, which includes a plurality of light-emitting elements LE such as the laser diodes or the VCSELs, the projection optical system 20, at least one LD drive circuit DC, the light receiving optical system 30, the light-receiving element (photodetector P), the processing circuit 60, and the first binarizing circuit 44. That is, in the present variation, the object detector 100 may not include the time measuring device 45, the measurement controller 46, the object recognizer 47, and the synchronous system 50. Note that the synchronous system 50 is used in a scanning object detector, but not used in a non-scanning object detector.

The object detector according to the present variation can exhibit the same advantageous effects as in the object detector 100 according to the present embodiment by changing the amount of light emission between a part of the illumination range and another part of the illumination range.

In the above described embodiments and variations, the laser diode LD or the VCSEL is employed as the light-emitting element LE. However, no limitation is intended therein. In some embodiment, other types of light emitting elements, such as organic electroluminescence (EL) elements and LEDs, may be employed as the light-emitting element LE.

The projection optical system 20 and the light receiving optical system 30 may not include the reflection mirror 24. That is, light emitted from the light source 10 (laser diode LD) may enter the rotating mirror 26 without the folded optical path.

Further, the projection optical system 20 may include any other optical element, such as a condenser mirror, instead of an image-forming lens.

Further, a light deflector may be any other mirror, such as a polygon mirror (rotating polygon mirror), a galvano mirror, or a micro electro mechanical system (MEMS) mirror, instead of the rotating mirror 26.

According to the above-described embodiment, an automobile is taken as an example for the mobile object 400 equipped with the object detector 100. Examples of the mobile object 400 may include a vehicle other than an automobile, an airplane, an unmanned aerial vehicle, a vessel, and a robot.

Further, specific numerical values and shapes taken for the above description are illustrative only, and can be modified as appropriate without exceeding beyond the scope of the present disclosure.

As is apparent from the above-description, the object detector 100, the sensing device 1000, and the mobile apparatus 600 according to the present embodiment and variations allow for the technology that measures the distance to an object, utilizing the Time of Flight (TOF) method or the technology used in the TOF. Such a technology is widely used in the industries of the motion-capture technology, the range instruments, and the three-dimensional shape measurement technology, in addition to the sensing in a mobile object 400. Therefore, the object detector 100 and the sensing device 1000 according to the present disclosure may not be mounted on a mobile object 400.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An object detector comprising:
   a light-emitting system including a light source that includes a plurality of light-emitting elements, each of the plurality of light-emitting elements comprising a laser, the light-emitting system to emit light; and
   a light-receiving system, comprising a plurality of photodetectors, to receive the light emitted from the light-emitting system and reflected by an object;
   wherein, in an XYZ three-dimensional coordinate system, the plurality of light-emitting elements is disposed in a light-emitting element array along a Z axis in a Z-axis direction in a YZ plane,
   wherein the plurality of light-emitting elements emit a plurality of light beams to a plurality of areas at different positions along the Z axis in the Z-axis direction from the plurality of light-emitting elements, and
   wherein an amount of light to illuminate some of the plurality of areas is different from an amount of light to illuminate other area other than the some of the plurality of areas.

2. The object detector according to claim 1, wherein the Z-axis direction is a vertical direction.

3. The object detector according to claim 1,
   wherein the light-emitting system further includes an optical system to guide the plurality of light beams emitted from the plurality of light-emitting elements to the plurality of areas, and
   wherein the optical system is configured such that some of light rays emitted from at least one of the plurality of light-emitting elements are lost while passing through the optical system.

4. The object detector according to claim 3,
   wherein the optical system includes a coupling lens disposed in an optical path of the plurality of light beams emitted from the plurality of light-emitting elements, and
   wherein only other light rays other than the some of the light rays emitted from the at least one of the plurality of light-emitting element pass through the coupling lens.

5. The object detector according to claim 4, wherein a center of the light source is displaced relative to a center of the coupling lens along the Z-axis direction.

6. The object detector according to claim 3,
   wherein the optical system includes a reflector, and
   wherein the reflector has a rotation axis parallel to the Z-axis direction such that the some of the light rays emitted from the at least one of the plurality of light-emitting elements do not strike the reflector.

7. The object detector according to claim 6, wherein the reflector is a light deflector having a rotation axis parallel to the Z-axis direction.

8. The object detector according to claim 1,
wherein the light source includes a plurality of the light-emitting element arrays disposed along a direction perpendicular to the Z-axis direction, and
wherein each of the plurality of light-emitting element arrays includes the plurality of light-emitting elements.

9. The object detector according to claim 1, wherein a light-emitting amount differs between some of the plurality of light-emitting elements corresponding to the some of the plurality of areas and other light-emitting element corresponding to the other area other than the some of the plurality of areas.

10. The object detector according to claim 9,
wherein the light-emitting system further includes a plurality of drive circuits to respectively drive the plurality of light-emitting elements,
wherein each of the plurality of drive circuits includes a capacitor to accumulate an electric charge to be supplied to a corresponding light-emitting element of the plurality of light-emitting element, and
wherein the capacitor differs in capacitance between some of the plurality of drive circuits, which drive a corresponding some of the plurality of light-emitting elements, and other drive circuits other than the some of the plurality of drive circuits to drive a corresponding other light-emitting elements other than the corresponding some of the plurality of light-emitting elements.

11. The object detector according to claim 9,
wherein each of the plurality of light-emitting elements includes a plurality of light-emitting sections, and
wherein a number of the plurality of light-emitting sections for each of the plurality of light-emitting elements differs between the some of the plurality of light-emitting elements and the other light-emitting element other than the some of the plurality of light-emitting elements.

12. A sensing device comprising:
the object detector according to claim 1; and
a monitoring controller to obtain object data including at least one of a presence or an absence of the object, a direction of movement of the object, and a speed of movement of the object based on an output of the object detector.

13. The sensing device according to claim 12, wherein the monitoring controller further determines a presence or an absence of danger based on at least one of positional information and movement information of the object.

14. A mobile apparatus comprising:
the sensing device according to claim 12; and
a mobile object provided with the sensing device.

15. A mobile apparatus comprising:
the object detector according to claim 1; and
a mobile object provided with the object detector.

16. A method comprising:
emitting light from a light-emitting system including a light source that includes a plurality of light-emitting elements, each of the plurality of light-emitting elements comprising a laser; and
receiving, by a light-receiving system comprising a plurality of photodetectors, the light emitted from the light-emitting system and reflected by an object;
wherein, in an XYZ three-dimensional coordinate system, the plurality of light-emitting elements is disposed in a light-emitting element array along a Z axis in a Z-axis direction in a YZ plane,
wherein the plurality of light-emitting elements emit a plurality of light beams to a plurality of areas at different positions along the Z axis in the Z-axis direction from the plurality of light-emitting elements, and
wherein an amount of light to illuminate some of the plurality of areas is different from an amount of light to illuminate other area other than the some of the plurality of areas.

* * * * *